(12) United States Patent
Palakodety et al.

(10) Patent No.: US 9,400,837 B2
(45) Date of Patent: Jul. 26, 2016

(54) REAL-TIME TEXT INDEXING

(75) Inventors: Ravi Palakodety, Redwood City, CA (US); Wesley Lin, West Covina, CA (US); Mohammad Faisal, Redwood City, CA (US); Garret F. Swart, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1078 days.

(21) Appl. No.: 12/979,413

(22) Filed: Dec. 28, 2010

(65) Prior Publication Data

US 2012/0166404 A1     Jun. 28, 2012

(51) Int. Cl.
*G06F 17/30* (2006.01)
(52) U.S. Cl.
CPC .... *G06F 17/30622* (2013.01); *G06F 17/30631* (2013.01)
(58) Field of Classification Search
CPC .................................................. G06F 17/30631

USPC ......................................................... 707/741
See application file for complete search history.

(56) References Cited

U.S. PATENT DOCUMENTS

| | | | |
|---|---|---|---|
| 5,920,854 A * | 7/1999 | Kirsch et al. | |
| 7,028,022 B1 * | 4/2006 | Lightstone et al. | |
| 2005/0108189 A1 * | 5/2005 | Samsonov | 707/1 |
| 2008/0270363 A1 * | 10/2008 | Hunt et al. | 707/3 |
| 2009/0089334 A1 * | 4/2009 | Mohamed et al. | 707/200 |

* cited by examiner

*Primary Examiner* — William Spieler
(74) *Attorney, Agent, or Firm* — Kraguljac Law Group, LLC

(57) ABSTRACT

Systems, methods, and other embodiments associated with real-time text indexing are described. One example method includes receiving a document for indexing in a search system that includes a mature index and indexing the received document in a staging index. The staging index may be stored in direct access memory associated with query processing that does not degrade query performance even when postings become fragmented. The staging index and the mature text index are accessed to process queries on the search system. The example method may also include periodically merging the staging index into the mature index based on query feedback.

18 Claims, 5 Drawing Sheets

REAL-TIME TEXT INDEXING

BACKGROUND

A text index is a data structure used to facilitate full-text search over unstructured text. The structure of a text index is typically an inverted index that maps individual tokens to a list of documents that contain them. Each token and its associated list is called a posting. When users issue full-text queries, the inverted index postings are consulted to efficiently find documents that contain tokens in the queries.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
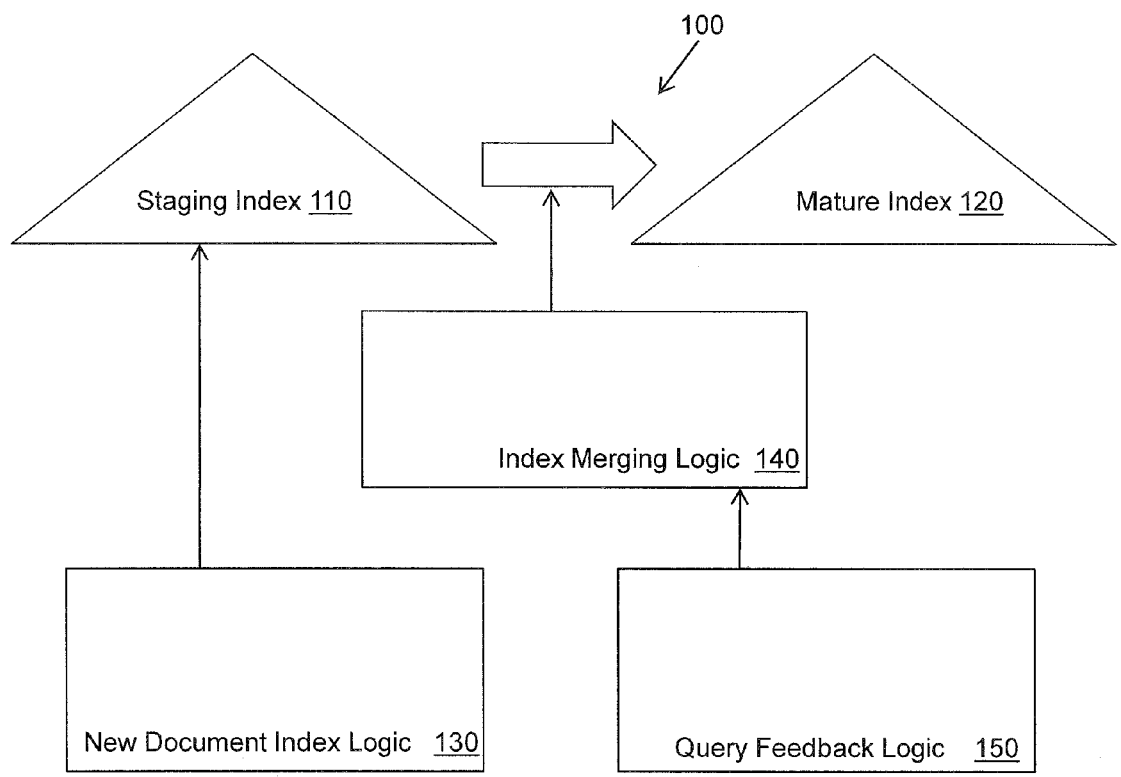
FIG. 1 illustrates an example system associated with real-time text indexing.

Managing a text index can be a difficult task, especially when users frequently add documents to a search system. The expanding use of communication-related documents, such as e mails, text messages, and twitter, means that new documents are being added to real-time search systems at an increasing rate. The addition of new documents to a search system fragments the text index for the search system, which causes degradation in query performance. To address the fragmentation issue, text indexes are typically periodically optimized. Among other things, the optimization process defragments the text index to restore query performance. Text index optimization is resource intensive, so it is usually scheduled in off-peak hours. However, real-time search systems may be in use nearly all the time, making scheduling of text index optimization difficult.

Real-time text indexing as described herein improves search performance by providing a staging index for indexing newly received documents. The staging index may be kept in direct-access memory associated with query processing, such as FLASH memory, so that the fragmentation that results from frequent additions of new documents will not affect query performance. The staging index can be periodically merged with the text index associated with the search system. For the sake of clarity, the text index associated with the search system will be called the "mature index".

The merging of the staging index into the mature index may be performed in a manner that minimizes impact on search system performance. For example, the staging index may be partially merged into the mature index on a per posting basis depending on the level of system resources that are available to perform merge operations. Finally, the merging may be performed based on feedback from queries being executed on the search system so that most often accessed postings may be merged first, improving search performance.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, is a physical component, examples of which include hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logic is described, it may be possible to distribute that single logic between multiple logics.

FIG. 1 illustrates an example embodiment of a search system 100 that includes a staging index 110 and a mature index 120. Both the staging index 110 and mature index 120 may be implemented as inverted indexes that include postings. Each posting maps a token (string of characters) to the documents and locations within the documents that contain the token. When the mature index is fully optimized, each posting is stored contiguously, either in memory or on disk, facilitating quick searches of the postings. The search system also includes a body of documents (not shown) that are remotely stored in a database. The mature index 120 is typically stored in the database as well.

The staging index 110 is not stored in the remote memory used to store the mature index. Rather, the staging index is stored in direct-access memory that can provide good search performance even when postings become fragmented. For example, the staging index may be stored in FLASH memory associated with query processing. The search system 100 accesses both the staging index 110 and the mature index 120 to process text searches on documents stored in the search system.

The search system 100 includes a new document index logic 130 that stores index information about newly received documents in the staging index 110. This indexing of newly received documents may be performed in near real-time because the staging index is in direct-access memory and fragmentation is not an issue. An index merging logic 140 merges postings from the staging index 110 into the mature index 120 when merge criteria are met. Because the staging index 110 is stored in direct-access memory, space may be limited so that merging may need to be performed fairly often. The merging of a staging index posting may include adding document information from the posting to a corresponding mature index posting and removing the posting from the staging index.

The index merging logic 140 may be distributed as a continuous background process. The background process wakes up when it has data to defragment. By detecting when the system is busy or not, the background process is able to tailor its speed to the environment. Thus, the merge criteria may include the amount of storage being used by the staging area, and/or the level of system usage. As the memory allocated for storing the staging index fills up, the index merging logic 140 may lower the system usage level threshold at which it will perform merging. Conversely, as the system usage level decreases, the index merging logic may lower the memory usage threshold at which it performs merging. When there is no meaningful optimization to perform, the background process automatically turns itself off.

In one example embodiment, the search system 100 also includes a query feedback logic 150. The query feedback logic monitors queries processed by the search system. The query feedback logic 150 may be implemented as an in-memory pipe to allow communication between the query process and the index merging logic 140. This communication can take place in near real-time at query commit time. The index merging logic 140 may use information about queries from the query feedback logic 150 to identify postings in the staging index that have been accessed by the monitored queries and to select one or more identified postings in the staging index 110 to be merged with the mature index 120.

Merging the staging index 110 into the mature index 120 based on queries that are being executed by the search system means that more frequently queried tokens will be more frequently merged with the mature index, improving query performance. Further providing direct feedback about queries to the index merging logic 140 will often allow the merging process to take place while mature index postings that have been recently queried are still in cache. This minimizes the I/O that the index merging logic 140 must perform, improving query performance for the search system.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
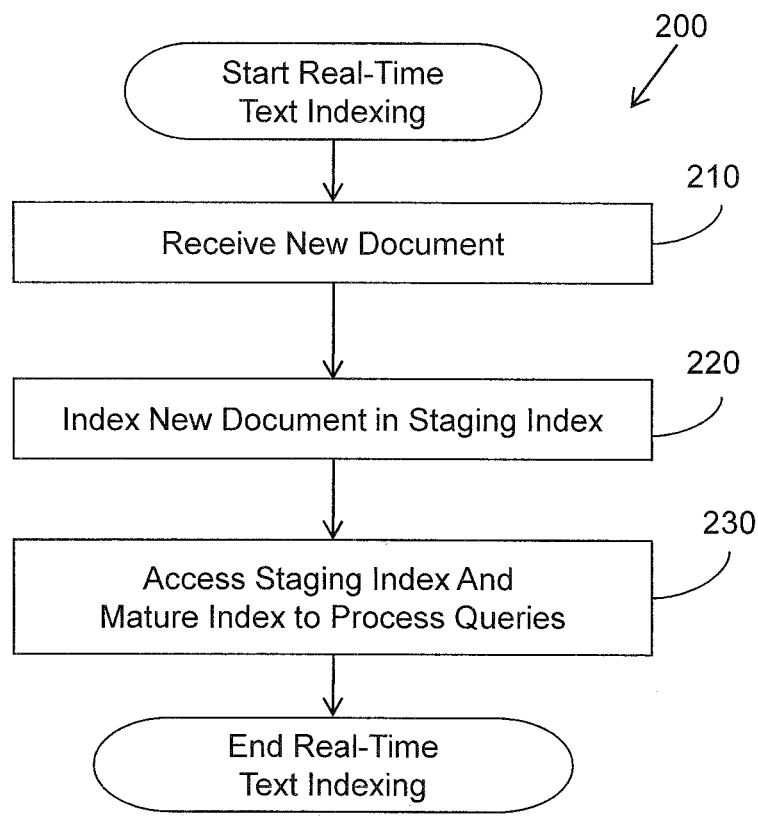
FIG. 2 illustrates an example method associated with real-time text indexing.

FIG. 2 illustrates an example embodiment of a method 200 for performing real-time text indexing. At 210, a document is received for indexing in a search system that includes a mature index. At 220, the received document is indexed in a staging index. At 230, the staging index and the mature text index are accessed to process queries on the search system. In some embodiments, the mature index is stored in remote memory associated with document storage while the staging index is stored in memory associated with query processing.

Figure 3:
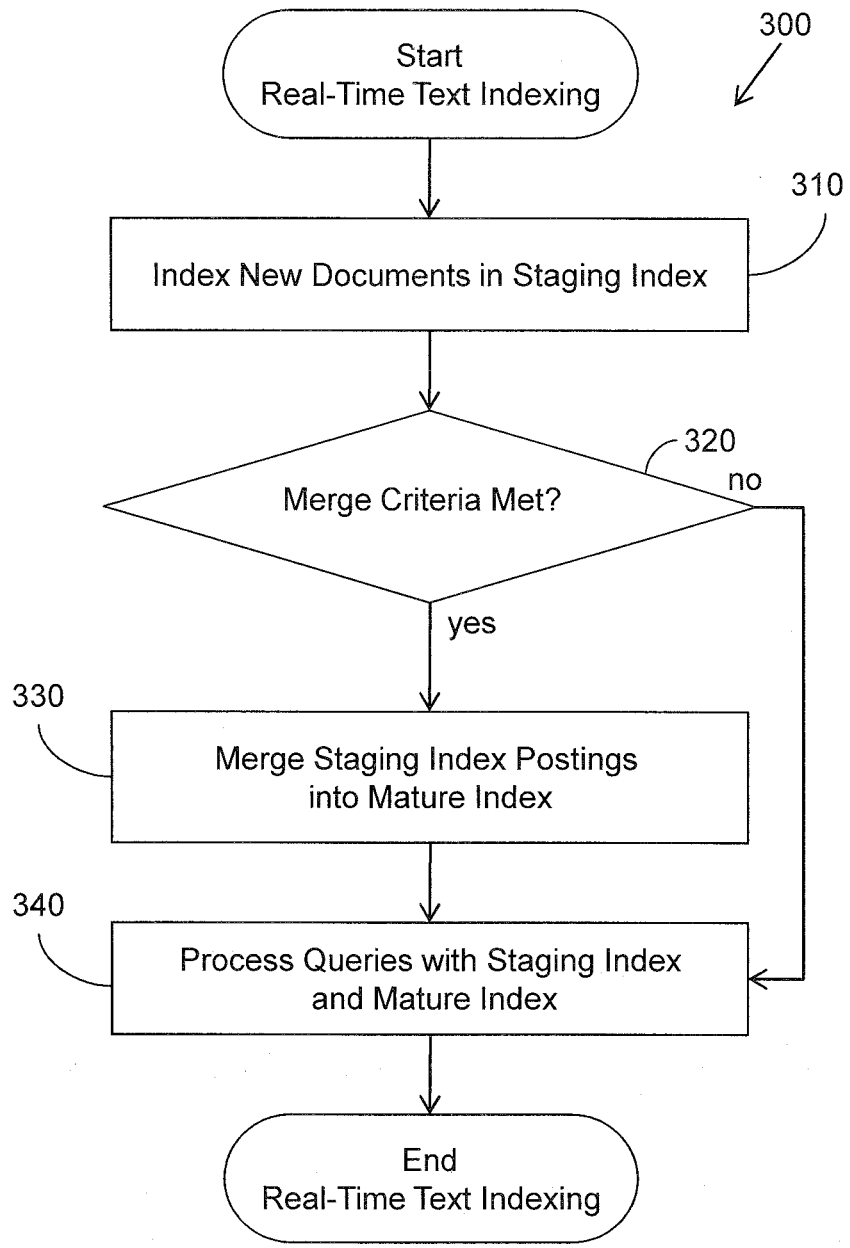
FIG. 3 illustrates another example method associated with real-time text indexing.

FIG. 3 illustrates an example embodiment of a method 300 for performing real-time text indexing. At 310 new documents are indexed in a staging index. At 320 a merge criteria is checked. For example, the merge criteria may include a maximum threshold for an amount of memory being used to store the staging index or a minimum threshold for system usage level. If the merge criteria is not met, the method continues to 340 and processes queries with both the staging index and the mature index. If the merge criteria is met, at 330, one or more staging index postings are merged into the mature index and at 340 queries continue to be processed using both the staging index and the mature index. The merging of a posting may be performed by adding document information from the posting to a corresponding mature index posting and removing the posting from the staging index.

Figure 4:
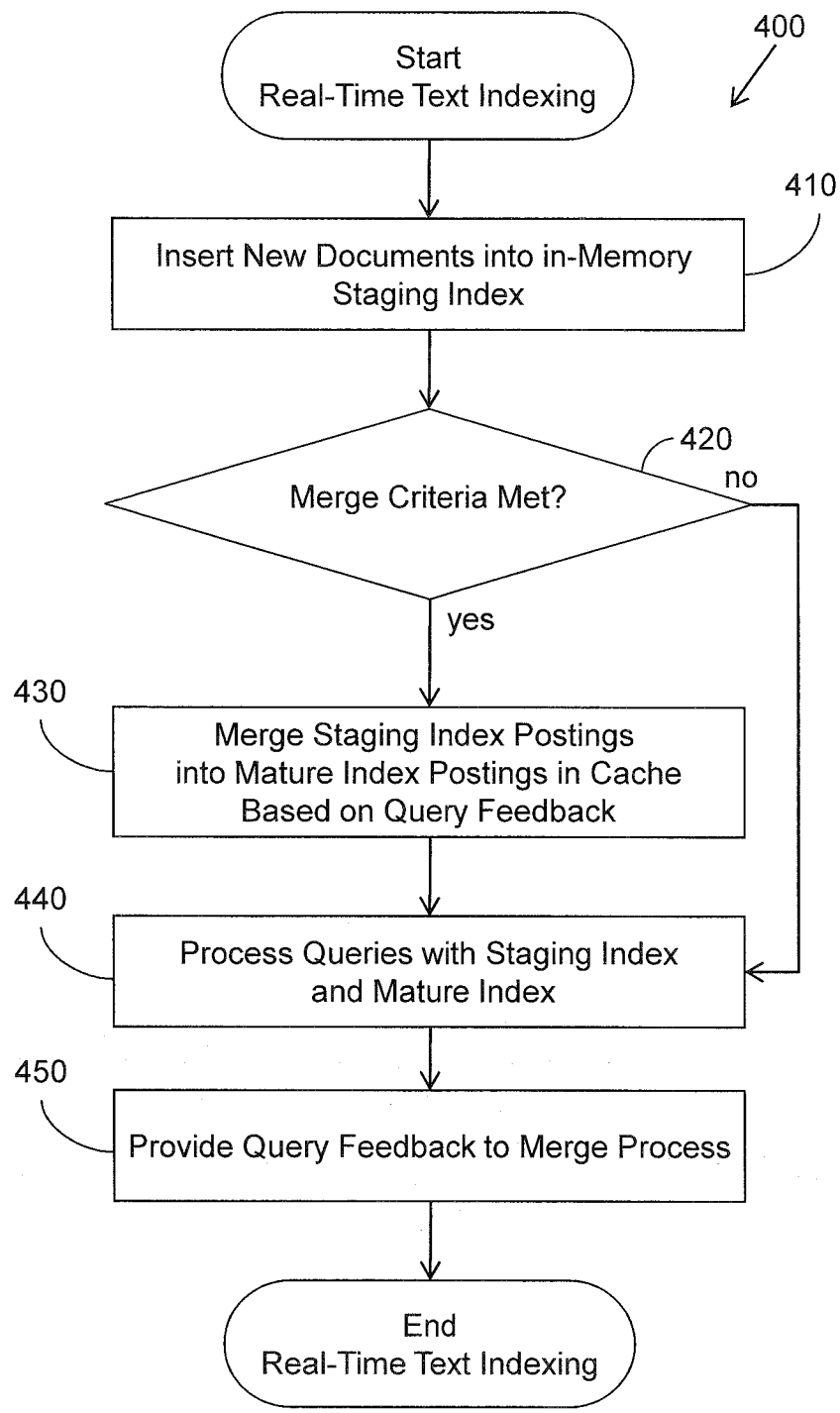
FIG. 4 illustrates another example method associated with real-time text indexing.

FIG. 4 illustrates an example embodiment of a method 400 for performing real-time text indexing. At 410 new documents are indexed in a staging index. At 420 a merge criteria is checked. If the merge criteria is not met, the method continues to 440 and processes queries with both the staging index and the mature index. If the merge criteria is met, at 430, one or more staging index postings are merged into mature index postings in cache memory based on query feedback. At 440 queries continue to be processed using both the staging index and the mature index. At 450 query feedback is provided to the merge process. The query feedback may be provided by monitoring queries processed by the search system. Postings in the staging index that have been accessed by the monitored queries can be identified. One or more identified postings in the staging index may then be selected to be merged into the mature index.

While FIGS. 2-4 illustrates various actions occurring in serial, it is to be appreciated that various actions illustrated in FIGS. 2-4 could occur substantially in parallel. By way of illustration, a first process could index documents in a staging index, a second process could merge the staging index into the mature index, and a third process could provide query feedback to the merging process. While three processes are described, it is to be appreciated that a greater and/or lesser number of processes could be employed and that lightweight processes, regular processes, threads, and other approaches could be employed.

"Computer-readable medium", as used herein, refers to a non-transitory medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In one example, a method may be implemented as computer executable instructions. Thus, in one example, a computer-readable medium may store computer executable instructions that if executed by a machine (e.g., processor) cause the machine to perform a method that includes receiving a document for indexing in a search system that stores document in remote storage and includes a mature index also stored in remote storage; indexing the received document in a staging index stored in memory associated with query processing; and accessing the staging index and the mature text index to process queries on the search system. While executable instructions associated with the above method are described as being stored on a computer-readable medium, it is to be appreciated that executable instructions associated with other example methods described herein may also be stored on a computer-readable medium.

Figure 5:
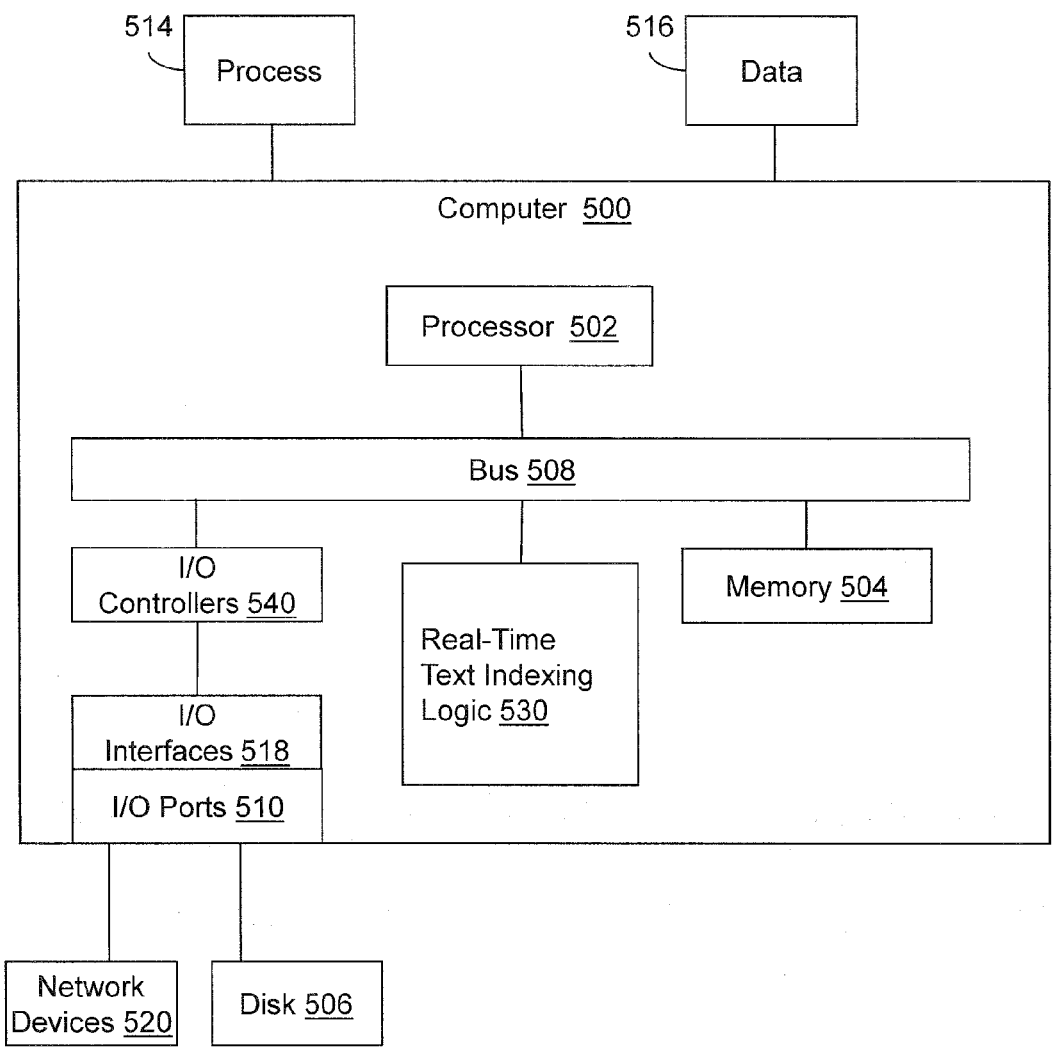
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a real-time text indexing logic 530 configured to facilitate real-time text indexing. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, real-time text indexing logic 530 may provide means (e.g., hardware, software, firmware) for indexing documents and storing index information for the new documents in a staging index. The means may be implemented, for example, as an ASIC programmed to perform real-time text indexing. The means may also be implemented as computer executable instructions that are presented to computer 500 as data 516 that are temporarily stored in memory 504 and then executed by processor 502. Real-time text indexing logic 530 may also provide means (e.g., hardware, software, firmware) for merging one or more postings in the staging index into the mature index when a merge criteria is met.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

"Software", as used herein, includes but is not limited to, one or more executable instructions that cause a computer, processor, or other electronic device to perform functions, actions and/or behave in a desired manner. "Software" does not refer to stored instructions embodied as stored instructions per se (e.g., a program listing). The instructions may be embodied in various forms including routines, algorithms, modules, methods, threads, and/or programs including separate applications or code from dynamically linked libraries.

What is claimed is:
1. A computer-implemented method, comprising:
receiving a document for indexing in a search system that includes a mature index, where the mature index is stored in remote memory associated with document storage;
indexing the received document in a staging index that is stored in a direct access memory associated with query processing;
accessing the staging index and the mature index to process queries on the search system; and merging one or more postings in the staging index into the mature index while maintaining the staging index in the direct access memory.

2. The computer-implemented method of claim 1 where merging the one or more postings in the staging index into the mature index occurs when a merge criterion is met.

3. The computer-implemented method of claim 2 where the merging of a posting is performed by:
adding document information from the posting to a corresponding mature index posting; and
removing the posting from the staging index.

4. The computer-implemented method of claim 1 comprising:
monitoring queries processed by the search system;
identifying postings in the staging index that have been accessed by the monitored queries;
selecting one or more identified postings in the staging index to be merged into the mature index.

5. The computer-implemented method of claim 4 comprising merging the postings in the staging index into portions of the mature index that are stored in a cache associated with the search system.

6. The computer-implemented method of claim 1 comprising monitoring search system usage and merging one or more postings in the staging index into the mature index when system usage falls below a threshold level.

7. The computer-implemented method of claim 1 comprising merging one or more postings in the staging index into the mature index when an amount of memory in use to store the staging index exceeds a threshold amount.

8. A computing system, comprising:
a memory;
a processor connected to the memory, wherein the processor is configured to execute instructions stored in the memory;
a new document index logic stored in a memory device and including instructions that when executed by the processor cause the processor to index documents received for processing by a search system that includes a mature index, the new document index logic further configured with executable instructions that when executed by the processor cause the processor to store index information for the new documents in a staging index, where the mature index is stored in remote memory associated with document storage and where the staging index is stored in a direct access memory associated with query processing;
wherein the memory device further includes stored instructions that when executed by the processor cause the processor to access the staging index and the mature index to process queries on the search system; and
an index merging logic stored in the memory device and including instructions that when executed by the processor cause the processor to merge one or more postings in the staging index into the mature index while maintaining the staging index in the direct access memory.

9. The computing system of claim 8 where the index merging logic further includes instructions that when executed by the processor cause the processor to merge a posting by:
adding document information from the posting to a corresponding mature index posting;
removing the posting from the staging index; and
defragmenting the mature index.

10. The computing system of claim 8 further comprising a query feedback logic stored in the memory device and including instructions that when executed by the processor cause the processor configured to:
monitor queries processed by the search system;
identify postings in the staging index that have been accessed by the monitored queries;
select one or more identified postings in the staging index to be merged by the index merging logic into the mature index.

11. The computing system of claim 8 where the index merging logic further includes instructions stored in the memory device that when executed by the processor cause the processor is configured to merge the postings in the staging index into portions of the mature index that are stored in a cache associated with the search system.

12. The computing system of claim 8 where:
the new document index logic comprises means for indexing documents and for storing index information for the new documents in a staging index; and
the index merging logic comprises means for merging one or more postings in the staging index into the mature index when a merge criterion is met.

13. A non-transitory computer-readable medium storing computer-executable instructions that when executed by a computer cause the computer to:
in response to receiving a document for indexing in a search system that stores document in a remote storage and includes a mature index also stored in the remote storage, index the received document in a staging index stored in a memory of the computer associated with query processing;
access the staging index and the mature index to process queries on the search system; and
merge one or more postings in the staging index into the mature index while maintaining the staging index in the direct access memory.

14. The non-transitory computer-readable medium of claim 13 where the instructions for causing the computer to merge the one or more postings in the staging index into the mature index are configured to cause the merging to occur when a merge criterion is met.

15. The non-transitory computer-readable medium of claim 14 where the merge criterion is based, at least in part, on system usage and an amount of memory in use to store the staging index.

16. The non-transitory computer-readable medium of claim 14 where the instructions for causing the computer to merge the one or more postings include instructions that when executed cause the computer to:
add document information from the posting to a corresponding mature index posting;
remove the posting from the staging index; and
defragment the mature index.

17. The non-transitory computer-readable medium of claim 13 where the instructions further include stored instructions that when executed by the computer cause the computer to:
monitor queries processed by the search system;
identify postings in the staging index that have been accessed by the monitored queries; and
select one or more identified postings in the staging index to be merged into the mature index.

18. The non-transitory computer-readable medium of claim 17 where the instructions for merging include instructions that when executed by the computer cause the computer to merge the postings in the staging index into portions of the mature index that are stored in a cache associated with the search system.

* * * * *